United States Patent
Nojoumian (10) Patent No.: US 12,504,741 B2
(45) Date of Patent: Dec. 23, 2025

(54) ADAPTIVE CYBER MANUFACTURING (ACM) THROUGH ONLINE HUMAN-AI PARTNERSHIPS

(71) Applicant: FLORIDA ATLANTIC UNIVERSITY BOARD OF TRUSTEES, Boca Raton, FL (US)

(72) Inventor: Mehrdad Nojoumian, Boca Raton, FL (US)

(73) Assignee: FLORIDA ATLANTIC UNIVERSITY BOARD OF TRUSTEES, Boca Raton, FL (US)

(*) Notice: Subject to any disclaimer, the term of this patent is extended or adjusted under 35 U.S.C. 154(b) by 721 days.

(21) Appl. No.: 17/862,022

(22) Filed: Jul. 11, 2022

(65) Prior Publication Data
US 2023/0011012 A1    Jan. 12, 2023

Related U.S. Application Data

(60) Provisional application No. 63/220,122, filed on Jul. 9, 2021.

(51) Int. Cl.
G05B 19/4155 (2006.01)
(52) U.S. Cl.
CPC ............ *G05B 19/4155* (2013.01); *G05B 2219/50391* (2013.01)
(58) Field of Classification Search
None
See application file for complete search history.

(56) References Cited

U.S. PATENT DOCUMENTS

| 10,671,240 B2 | 6/2020 | Gildert et al. |
| 10,981,563 B2 | 4/2021 | Nojoumian |
| 2010/0087955 A1* | 4/2010 | Tsusaka ............ B25J 9/0003 700/245 |

(Continued)

OTHER PUBLICATIONS

Beer et al., "Toward a Framework for Levels of Robot Autonomy in Human-Robot Interaction", Journal of Human-Robot Interaction, vol. 3, No. 2, pp. 74-99 (2014).

(Continued)

*Primary Examiner* — Sean Shechtman
(74) *Attorney, Agent, or Firm* — Meunier Carlin & Curfman LLC (57) ABSTRACT

An adaptive cyber manufacturing facility method and system is disclosed for performing a task remotely on an object at an adaptive cyber manufacturing facility having a robotic device. The method may include receiving, via a computing device, cyber manufacturing system data; reporting the cyber manufacturing system data to a remote user of the robotic device via a user interface; acquiring user condition data regarding a condition of the user via the computing device; acquiring instructions from the user interface for remotely operating the robotic device to perform the task; automatically selecting a cyber manufacturing system operational mode from a plurality of pre-defined cyber manufacturing system operational modes based on the user condition data; and causing control of the robotic device to perform the task on the object according to the instructions from the user interface based on rules associated with the selected cyber manufacturing system operational mode.

20 Claims, 4 Drawing Sheets

(56) References Cited

U.S. PATENT DOCUMENTS

| | | | | |
|---|---|---|---|---|
| 2011/0130876 | A1* | 6/2011 | Gao | B25J 9/1633 |
| | | | | 700/258 |
| 2019/0073030 | A1* | 3/2019 | Lee | B25J 13/087 |
| 2021/0170590 | A1* | 6/2021 | Laftchiev | B25J 9/163 |
| 2023/0028457 | A1* | 1/2023 | Kamon | B25J 13/065 |

OTHER PUBLICATIONS

Parasuraman et al., "Humans and Automation: Use, Misuse, Disuse, Abuse", Human Factors, Human Factors and Ergonomics Society, vol. 39, No. 2, pp. 230-253 (1997).

Monostori et al., "Cyber-Physical Systems in Manufacturing," CIRP Annals, vol. 65, No. 2, pp. 621-641 (2016).

Lee et al., "Research Letters, A Cyber-Physical Systems Architecture for Industry 4.0-Based Manufacturing Systems," Manufacturing Letters, vol. 3, pp. 18-23 (2015).

Lee et al., "Introduction to Cyber Manufacturing", Manufacturing Letters, vol. 8, pp. 11-15 (2016).

Ren et al., "Cyber Security in Smart Manufacturing: Survey and Challenges", Proceedings of the 2017 Industrial and Systems Engineering Conference, pp. 716-721 (2017).

Babiceanu et al., "Big Data and Virtualization for Manufacturing Cyber-Physical Systems: A Survey of the Current Status and Future Outlook", Computers in Industry, vol. 81, pp. 128-137 (2016).

Jeschke et al., "Industrial Internet of Things and Cyber Manufacturing Systems", Introduction, Springer International Publishing Switzerland, pp. 3-19 (2017).

* cited by examiner

ADAPTIVE CYBER MANUFACTURING (ACM) THROUGH ONLINE HUMAN-AI PARTNERSHIPS

CROSS-REFERENCE TO RELATED APPLICATIONS

This non-provisional application claims the benefit under 35 U.S.C. § 119(e) of Application Ser. No. 63/220,122 filed on Jul. 9, 2021 ADAPTIVE CYBER MANUFACTURING (ACM) THROUGH ONLINE HUMAN-AI PARTNERSHIPS, and whose entire disclosure is incorporated by reference herein.

This invention relates to robotics and more particularly to systems, devices and methods for real-time translation of human movement into robotic manipulation of objects.

BACKGROUND

In the current global crisis, many employees including educators, managers, and software engineers, to name a few, are still able to meet virtually and work remotely. However, many front-line factory workers such as those in food services, automotive and aerospace are losing their jobs or risking their lives to remain employed. This has led to significant negative impacts on manufacturing, economic growth, employment rate, etc. Although limited manufacturing tasks can be accomplished by robotic systems without any human intervention, e.g., packaging or welding, there are many tasks where factory workers still need to interact with objects in the pre-processing phase or production lines, e.g., recycling manufacturing where workers separate items after some robotic pre-screenings.

As these cyber manufacturing (CM) platforms evolve and their levels of complexity advance over time, their presence in employees' daily activities also leads to new challenges, for instance, human trust in this virtual human-artificial intelligence (AI) partnership as well as cybersecurity concerns since they create a huge attack surface for malicious actors, among others. These concerns will affect the employees' satisfaction/frustration, safety of the working environment, collaborative decision making, and team performance, to name a few. Therefore, human factors and sustainable social acceptability in addition to cybersecurity measures will play a significant role in this new landscape.

Studies have indicated that one of the primary challenges in successfully integrating advanced AI technologies in human's lives is the management and development of mutual trust, which may significantly affect human factors and humans-AI partnerships, in general. The possible misuses and abuses that humans would bring into AI technologies is another prominent issue in this domain. Humans can become overly dependent on automation technology, attempt to use functions that are out of the scope of the system, or not monitor the system adequately. In one such study, subjects were given information sources regarding the usage of an autonomous system with faulty behavior. This study revealed that, when more errors occur, the subjects will not use the information provided to them due to a lack of trust. Therefore, a proper trust management strategy would help the users utilize such information even in the presence of errors. In addition, a fair amount of consideration should be given to the security of AI systems, a.k.a. trustworthy AI. The emerging AI and autonomy technologies are constantly providing new opportunities for attackers who intend to compromise these systems.

Remote controlled robotic devices are known in the art. See, e.g., U.S. Pat. No. 10,671,240 B2.

Lee et al. [4] propose a detailed cyber-physical systems (CPS) architecture for Industry 4.0-based manufacturing systems. The authors also introduce a fundamental framework and architecture for CM platforms [5].

Monostori et al. [3] comprehensively review cyber-physical production systems (CPPS) from perspectives of computer science, information and communication technologies as well as manufacturing science.

Cybersecurity concerns in CM are discussed by Ren et al. [6]. They review state of the art technologies that can address cybersecurity issues in smart manufacturing.

Virtualization and big data analytics in CM are scrutinized by Babiceanu and Seker [7]. They provide a review of the current status of virtualization and cloud-based services for manufacturing systems and CM using big data analytics.

Finally, Jeschke et al. [8] provide a comprehensive CM review in the contexts of CPPS modeling, architectural design patterns for CM and Internet of Things (IoT), communication and networking, AI and analytics, evolution of workforce and human-machine interaction, and future trends of IoT and CM.

Despite the foregoing developments, there is room in the art for further improvements. It is therefore desired to provide robotic systems, devices and methods to enable workers to perform a greater variety of tasks remotely. All references cited herein are incorporated herein by reference in their entireties.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The adaptive cyber manufacturing system dynamically changes the behavior of the ACM as well as workload (limit or slow down the task in real-time) while it is being used by humans to be responsive to the user's performance. Team can work together using this adaptive CM system meaning that a group of users may work with a set of robots at the same time in a form of human-robot teaming. The adaptive CM system provides a safe, inclusive (age, gender, ability, etc), and scalable CM platform. It provides job opportunities to people with various levels of training, expertise, and ability, e.g., disabled people, women, seniors, etc.

The foregoing and/or other aspects and utilities embodied in the present disclosure may be achieved by providing a method for performing a task remotely on an object at an adaptive cyber manufacturing facility having a robotic device. The method includes: receiving, via a computing device, cyber manufacturing system data including information regarding operation of a cyber manufacturing system, regarding operation of the robotic device at the cyber manufacturing facility, and regarding the object on which the task is to be performed by the robotic device; reporting the cyber manufacturing system data to a remote user of the robotic device via a user interface; acquiring user condition data regarding a condition of the user via the computing device; acquiring instructions from the user interface for remotely operating the robotic device to perform the task; selecting, by the computing device, a cyber manufacturing system operational mode from a plurality of pre-defined cyber manufacturing system operational modes based on the user condition data; and causing, via the computing device, control of the robotic device to perform the task on the object according to the instructions from the user interface based on rules associated with the selected cyber manufacturing system operational mode.

According to aspects illustrated herein, an adaptive cyber manufacturing system including a robotic device, a non-transitory storage medium, a user interface and a processor is described. The robotic device is at a cyber manufacturing facility. The user interface is remote from the robotic device. The processor is configured to access the non-transitory storage medium and execute computer-executable instructions stored in non-transitory storage medium to cause the system to: acquire cyber manufacturing system data including information regarding operation of the robotic device and regarding an object on which a task is to be performed by the robotic device at the cyber manufacturing facility; report the cyber manufacturing system data to a remote user of the robotic system via the user interface; acquire user condition data regarding a condition of the user; acquire instructions from the user interface for remotely operating the robotic device to perform the task; select a cyber manufacturing system operational mode from a plurality of pre-defined cyber manufacturing system operational modes based on the user condition data; and cause control of the robotic device to perform the task on the object according to the instructions from the user interface based on rules associated with the selected cyber manufacturing system operational mode.

In examples, information regarding the object on which the task is to be performed includes information of the cyber manufacturing facility associated with the object. In examples, the user condition data is received by the computing device from a sensing device, the user condition data including one of the user's performance status, the user's emotion and physiological status, the user's emotion and physiological response to the cyber manufacturing system, and a detection of unusual cyber manufacturing system activity, the cyber manufacturing system including the user interface, the robotic device, the cyber manufacturing facility and the computing device. In examples, the user's performance status may correlate to user emotion and physiological status including one of user trust level in the cyber manufacturing system, user satisfaction level with the cyber manufacturing system, user fatigue level, user emotional state, user physical disability, user physiological status, and user expertise according to the user's performance ability.

In examples, the selected cyber manufacturing system operational mode may include: a normal mode when the user condition data indicates that the user does not currently have anxiety, distrust, frustration, fatigue, or stress based on the cyber manufacturing system; a performance mode when the user condition data indicates that the user is operating at a superior performance level higher than a predetermined threshold level, and workload is increased from the normal mode; a cautious mode when the user condition data indicates that the user currently has anxiety, distrust, frustration, fatigue, or stress based on the cyber manufacturing system, the cautious mode having a decreased workload from the normal mode; an alert mode when the user condition data indicates that the person has a disability or limitation due to health or age, the alert mode having a decreased workload from the normal mode; and a failure mode when the user condition data indicates a detection of unusual cyber manufacturing system activities based on any one of the user condition data, an operational failure of the cyber manufacturing system, malware and a cyber-attack. The adaptive cyber manufacturing system may include an emergency-awareness feature that reports at least one of medically-abnormal states or life-threatening states to emergency units. The system may also communicate the user condition data and the selected cyber manufacturing system operational mode with a second cyber manufacturing system for achieving objectives of an Adaptive Cyber Manufacturing system and objectives of customized cyber manufacturing.

In examples, the sensing device may include a heart rate sensor, a skin perspiration sensor, a temperature sensor, a gesture detection sensor, a blinking rate detection sensor, a camera, a brain-computer interface and/or a microphone. In examples, the rules associated with the selected cyber manufacturing system operational mode may include control modifications for the robot and the cyber manufacturing facility. In examples, the user interface may include a brain-computer interface that detects brain activity of the user and associates the brain activity with the instructions from the user interface for remotely operating the robotic device to perform the task. The user interface may also include a camera that monitors user motion including eye movement, face gesture, and hand movement of the user and associates the user motion with the instructions from the user interface for remotely operating the robotic device to perform the task. The cyber manufacturing system operational mode may be selected based on machine-learned patterns associated with the user condition data and operation of the cyber manufacturing system. The cyber manufacturing system operational mode may also be selected based on machine-learned patterns associated with the user condition data and operation of the cyber manufacturing system.

According to aspects described herein, a computer program product is described below for providing a user with control of at least one robotic device, the computer program product comprising a non-transitory storage medium readable by a processor, wherein the non-transitory storage medium stores instructions executable by the processor to cause the method of the invention to be performed.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for a new cyber manufacturing platform for digital transformation of work.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

A "processor" as used herein may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like.

The term "controller" is used herein generally to describe various apparatus relating to the operation of one or more device that directs or regulates a process or machine. A controller can be implemented in numerous ways (e.g., such as with dedicated hardware) to perform various functions discussed herein. A processor is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

As used herein, a "non-transitory storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples of the computer-readable medium include but are not limited to: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

In examples, a novel online platform is provided for production line workers so that they can accomplish their daily tasks in real-time through online meetings with their robotic device partners. Although examples describe the device including a robotic arm, the invention is not limited thereto. A robot or robotic device refers to a machine, typically programmable by a computing device or computer, that is capable of carrying out a complex series of actions automatically or by control of an external controller of the computing device. While a robot may be configured to evoke human form (e.g., arm, hand, leg, fingers, etc.) it is understood that the robot is a task-performing machine and may have an emphasis on functionality over aesthetics.

Examples facilitate human-cyber manufacturing (CM) interactions and increase the necessary trust to form efficient partnerships. An adaptive cyber manufacturing (ACM) will interact effectively with humans to engender trust and gain community acceptance in cyber manufacturing (CM) industries. As a result, employees' satisfaction, safety of the working environment, team performance, and cyber manufacturing capabilities will be enhanced. Examples may take into account human aspects of tele-manufacturing to better understand the societal aspects of cyber manufacturing systems. For example, human trust, satisfaction and frustration (TSF) will be monitored along with tasks' duration, accuracy and speed (DAS) and safety, inclusiveness and scalability (SIS).

An adaptive cyber manufacturing platform may use machine learning techniques. The adaptive cyber manufacturing may be responsive to human emotions, such as trust or fatigue, and it may customize the targeted task, e.g., slow down or limit the task, to accommodate any workers with any ability and demographic background. Moreover, machine-learning algorithms may predict user's action, user condition data, or cyber manufacturing system's action whenever it's necessary including delays in communication, or a system failure as understood by a skilled artisan.

In addition, examples may provide security detection mechanisms and countermeasures to mitigate the impacts of cybersecurity attacks. Exemplary mechanisms approach cybersecurity concerns from a non-traditional angle to first understand their impact on workers' trust, satisfaction and frustration and then provide behavior-based detection mechanisms and countermeasure solutions.

Because online cyber manufacturing platforms will create a huge attack surface for hackers, examples may provide security guidelines and countermeasures that are behavior-based.

Exemplary systems may enable the detection of intelligent adversaries (IA) who are rational agents/human beings attempting to compromise the cyber manufacturing with the aim of malicious activities. Intelligent adversaries can engage in low-profile activities designed to escape the attention of traditional means for detecting unauthorized activities in a network. As an example, an IA's activities may be: (1) Limited: the IA may send one command to the compromised CM once in a while to make sure the IA can still control the system; (2) Targeted: the IA may compromise just one single entity in a network of CM components to harm a specific victim or utilizes the victim's system to harm others; (3) Adaptive: the IA learns and adjusts malicious strategy accordingly; and (4) Rational: the IA maximizes utility by escalating the extent of the damage the IA can cause. The invention enables a better understanding of the evolution of intelligent adversaries' behavior in growing cyber manufacturing technologies, and leverages behavior/trust, satisfaction and frustration (TSF) analysis as well as cyber deception methods derived from behavior analysis.

Exemplary solutions generally concerns implementing systems and methods for performing tasks remotely on an object at a cyber manufacturing system having a robotic device based on machine-learned human mood(s). A system acquires user condition data of a user who may be remote from the cyber manufacturing system, which may be a factory or other location where work is performed on an object. The system selects an operational mode for interaction between the user, robotic device and other machinery at the cyber manufacturing system location in real-time, possibly with use of learning mechanisms, and then adaptively controls operation at the cyber manufacturing system to be responsive according to the operational mode. The user condition data may include of the user's performance status, the user's emotion and physiological status, the user's emotion and physiological response to the cyber manufacturing system, and a detection of unusual cyber manufacturing system activity. The user's performance status may be acquired directly or indirectly, and may include user physical disability, user fatigue, user vigor, user emotional state, user physiological status, and user expertise according to the user's performance ability.

The user's emotion and physiological status may include the user's state of the mind, which may be analyzed and predicted in terms of trust, distrust, fear, anxiety, happiness, etc. in regards to the robot device and cyber manufacturing system operation and/or behavior as well as the general feeling of the person. Accordingly, one of numerous modes of operation (e.g., cautious, normal, performance, alert and failure) may be utilized. In this context, the cyber manufacturing system may include, but is not limited to, a robotic device, an operational facility or platform, a user interface, a sensing device, a controller, computing device and communication device to perform a task on an object according to instructions from the user interface in view of rules associated on the selected operational mode.

The user condition data may be updated in real time and affect selection of the operational mode. For example, the user condition data may be updated in view of the user's trust in operation of the robotic device at the cyber manufacturing system. As such, the system may try to establish trust in initial user interactions (cautious operation mode) with the robotic device, sustain it over time (normal operation mode), and rebuild it in the case of incidental failures (alert operation mode) by revising workload (e.g., slowing or speeding up robotic device operation, slowing or speeding up cyber manufacturing system operation associated with the robotic device, changing speeds of a conveyer belt or system moving the object, changing distances between adjacent objects) in the cyber manufacturing system to allow the user additional time to perform a task with the robotic device on the object in each mode of operation. The system may use supervised and/or unsupervised learning modules to process collected data for a proper prediction and response. The response can include, but is not limited to, the operation mode as well as a change in illumination, sounds, pace, etc. The data is collected (in)-directly (hybrid) or indirectly (objective) through human expressions, intrusive (e.g., galvanic skin response embedded into the seats/handles) and non-intrusive (e.g., visible-light and thermal cameras) devices.

The adaptive cyber manufacturing (ACM) may include a safe, inclusive and scalable online cyber manufacturing platform, as described in greater detail below. In certain embodiments, non-intrusive devices along with a brain-computer interface, eye or head movements may be utilized. This will provide factory job opportunities to people with disabilities, seniors and other persons who may have limited strength.

Certain examples of the invention may include a novel reflective module to maximize satisfaction and/or minimize frustration. The module dynamically changes the behavior of the adaptive cyber manufacturing while it is being used by humans. This system may sense the emotional state of the human worker and respond by choosing an appropriate mode of operation. The operation mode of the adaptive cyber manufacturing may be revised based on direct and indirect feedback from human subjects, and the trust, satisfaction and frustration factors. Duration, accuracy and speed parameters may be measured to validate that the reflective module is responsive to human emotion.

Certain examples of the invention may include a supervised learning module to correlate the collected data from human users with data received from intrusive and non-intrusive user interface devices. In a particular example, the modules collects data from non-intrusive devices and predict the state-of-emotion in human users without any direct inputs. For example, non-intrusive devices such as cameras and sensors along with machine learning modules analyze data in real-time to predict the emotional state of workers.

Figure 1:
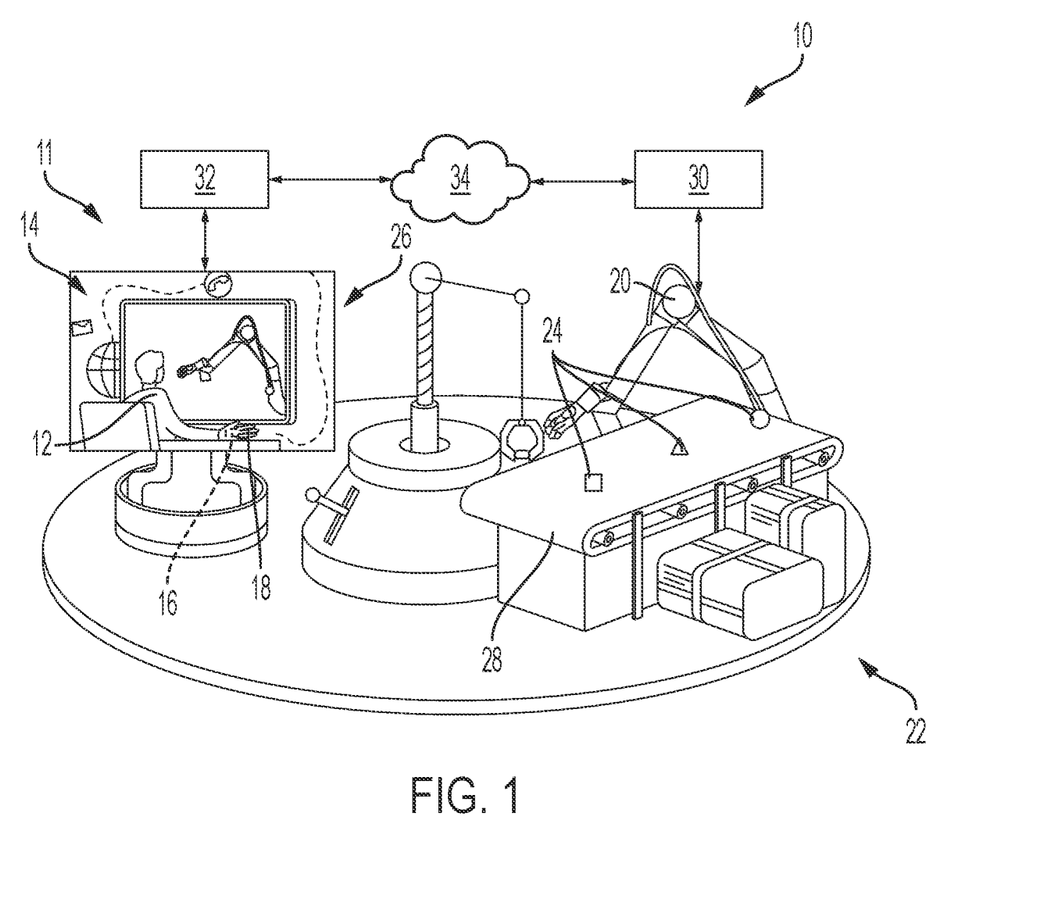
FIG. 1 is a schematic depiction of a robotic system (e.g., adaptive cyber manufacturing system) in accordance with examples of the embodiments.

FIG. 1 depicts an exemplary robotic system 10 that may also be referred to as an adaptive cyber manufacturing system. At a first location 11, a user 12 utilizes an existing online video communication platform 14 (e.g., video monitor) of the robotic system 10 along with wireless sensing devices 16 (e.g., sensor, control stick, keyboard, control ball) connected to hand 18 of user 12 to control a robotic device 20 (e.g., robotic arm) at a second location 22. The second location 22 may be distal or remote from the first location 11. For example, the second location 22 may be at a cyber manufacturing facility (e.g., manufacturing plant, factory, online cyber manufacturing platform) and the first location 11 may be at a dwelling, office, residence or other location comfortable for the user 12. Although FIG. 1 shows a user interface 26 as including wireless sensing devices 16 connected to a hand 18 of the user 12, in examples the user interface may additionally or alternatively include other approaches for detecting movements of user 12 directly or without contact with the user. Non-limiting examples of user interfaces include wireless sensors, wired sensors, imaging devices, touchscreens and other sensory equipment. The sensing devices 16 may be wireless or wired connected to a computing device 30 that may include or be in communication with a controller 32 to operates the robotic system 10. While the computing device 30 and controller 32 are shown separately, it is understood that the controller 32 may be integral with or part of the computing device 30. In addition components of the computing device 30 may also or alternatively be part of the controller 32. For example, the computing device 30 may include an adaptive cyber manufacturing (ACM) software module 36, which may also or alternatively be stored in the controller 32.

The user interface 26 may also include the online video communication platform 14, with the user interface generally configured to communicate data to and from the controller 32 and computing device 30 via a network 34 (e.g., the Internet or World Wide Web). The cyber manufacturing system, including object 24, machinery at the cyber manufacturing facility associated with the object, and the robotic device 20 is configured to communicate data to the controller 32, computing device 30 and user interface 26 via the network 34. In this way, the user interface is in communication with the system 10 so that the robotic device 20 operations can be monitored and controlled by the computing device 30 in accordance with the user instructions via the user interface and rules associated with a selected operational mode of the cyber manufacturing system, as will be described in greater detail below. As such, the robotic system 10 (i.e., the adaptive cyber manufacturing system) may include the cyber manufacturing facility and its operational devices including the production line 28 and robotic device 20, as well as the computing device 30, controller 32 and user interface 26.

Robotic arm 20 is a robotic device that may imitate movements of user 12 as movement instructions tracked by the user interface. In examples, such movements may be tracked and imitated by the robotic arm 20 in real time and/or user movement instructions may be delayed and/or stored before being carried out by the robotic arm. It is understood that robotic devices may include any machine configured to carry out movement, operational or other task instructions from a user remotely on an object 24 at the second location 22.

The ACM software module 36 facilitates the configuration and selection of cyber manufacturing system operational modes in accordance with user condition data that identifies a condition of the user that may affect timely performance of the robotic device 20 to perform tasks on the object 24. The adaptive cyber manufacturing system operational modes include, but are not limited to, a normal mode, a performance mode, a cautious mode, an alert mode, and a failure mode. The adaptive cyber manufacturing system operational modes may also include an intro learning mode, as an operational mode where practice and/or real tasks are done to introduce the user 12 to the adaptive cyber manufacturing system through adaptive human-machine interactions. The intro learning mode may be included as an operation mode as an introductory phase where intention is to help the adaptive cyber manufacturing system learning about the user condition data and also to help the user learn about the adaptive cyber manufacturing system operation and ability.

The normal operational mode is selected hen the user condition data indicates that no anxiety, distrust, frustration, fatigue, or stress is detected for the user 12 based on the cyber manufacturing system. In the normal operational mode, the adaptive cyber manufacturing facility operates in accordance with workload pace rules associated with its default settings. The performance operational mode is selected when the user condition data indicates that the user 12 is operating at a superior performance level or high level of alertness higher than a predetermined threshold level associated with a normal workload. In the performance operational mode, the adaptive cyber manufacturing facility operates in accordance with workload pace rules increased from the normal mode.

The cautious operational mode may be selected when the user condition data indicates that anxiety, distrust, frustration, fatigue, or stress is detected for the user 12 based on operation of the cyber manufacturing system. In the cautious operational mode, the adaptive cyber manufacturing facility operates in accordance with workload pace rules decreased from the normal mode. It should be noted that the user condition data may be continuously or periodically monitored, and the selected cyber manufacturing system operational mode may be dynamically changed in real time to another mode based on more recent user condition data. For example, the robotic system 10 may shift the selected cyber manufacturing system operation mode from a cautious operation mode to the normal operational mode upon an updated user condition data indicating that the user no longer has anxiety, distrust, frustration, fatigue, or stress based on the cyber manufacturing system. In addition, the workload pace rules associated with the cautious operation mode may decrease to any of a plurality of decreased workload paces depending on the level of anxiety, distrust, frustration, fatigue, or stress is detected for the user 12.

The alert operational mode is selected when the user condition data indicates that the person has a disability, which may be due to physical, mental, age, physiological or concentration limitations. In the alert operational mode, the adaptive cyber manufacturing facility operates in accordance with workload pace rules decreased from the normal mode. In addition, the workload pace rules associated with the alert operation mode may decrease to various decreased workload paces depending on the type and level of disability detected for the user 12. The failure operational mode may be selected when the user condition data indicates a detection of unusual cyber manufacturing system based on any one of the user condition data, an operation failure of the cyber manufacturing system, and a cyber-attack. In the failure operational mode, the adaptive cyber manufacturing facility may automatically shut down or may operate in accordance with workload pace rules significantly decreased from the normal mode. In addition, when in the failure mode, the adaptive cyber manufacturing system may activate an emergency-awareness feature that reports at least one of medically-abnormal states or life-threatening states to emergency units, as well understood by a skilled artisan. Accordingly, the adaptive cyber manufacturing system 10 includes security detection mechanisms and countermeasures to mitigate the impacts of any cybersecurity attacks. This helps to better provide a safe, inclusive and scalable online cyber manufacturing platform.

Accordingly, in the performance, cautious, alert, and failure operational modes, the adaptive cyber manufacturing facility operates in accordance with one or more non-default settings. For example, a default setting of the normal operational mode is for the facility to operate at a generally normal workload or work flow pace, as understood by a skilled artisan. The non-default setting of the performance operational mode may be to operate at an increased workload (e.g., 50% greater workload, or greater than 10% greater workload, or greater than one % greater workload, or about 2 additional tasks per minute). The non-default setting of the cautious operational mode may be to operate at a decreased workload (e.g., 50% lesser workload, or greater than 10% lesser workload, or greater than one % lesser workload, or about 2 fewer tasks per minute). The non-default setting of the alert operation mode may be to operate at a decreased workload in accordance with a level of disability (e.g., 80% lesser workload, or greater than 30% lesser workload, or greater than one % lesser workload, or about 1-10 fewer tasks per minute). The non-default setting of the failure operation mode may be to operate at a decreased workload (e.g., greater than 80% lesser workload), or come to a complete stop as soon as possible. Task duration, accuracy and speed can be used as sub-dimensions affecting workload. The examples are not limited to the particulars of these described examples.

Each of the aforementioned operational modes has one or more pre-defined rules associated therewith for controlling operations of the adaptive cyber manufacturing system. For example, a pre-defined rule of the cautious mode is designed to rebuild the user's trust and/or deal with a user's fears or anxieties in relation to the robotic device 20 behavior or a recent event (e.g., too many objects associated with a high workload and inability to perform the tasks). In this regard, the rule states that (1) the workload pace is to remain below a given threshold value, (2) the workload pace decreases upon a failed task attempt, (3) the workload pace increases upon three consecutive successful task attempts, (4) the workload pace decreases if a task takes longer than a threshold time (e.g., 1 minute, 30 seconds), and/or (5) the workload pace increases if successful performance of consecutive tasks takes less time than a threshold time (e.g., 1 minute, 90 seconds). The examples are not limited to the particulars of the described examples.

User condition data may include indicia of the user's mood or emotion, which may be predicted by the computing device 30 using sensor data generated by one or more sensing devices 16. Sensing devices 16 may be coupled to the user 12 as shown in FIG. 1 or located adjacent to the user (e.g., located adjacent or on a user interface 26). The sensing device 16 may include, but is not limited to, a heart rate sensor, a skin perspiration sensor, a facial temperature sensor, a gesture detection sensor, a blinking rate detection sensor, a camera, a brain-computer interface and/or a microphone (e.g., to capture speech). Sensor data is communicated from the sensing device 16 to the ACM software module 36 for processing. An illustrative architecture for the sensing device 16 will be discussed below in relation to FIG. 2.

Other information can additionally be used by the computing device 16 to predict the user 12 mood or emotion. This other information may include, but is not limited to, demographic information or social media information stored in a data storage device 38 that may be in the computing device 30, the controller 32 or in communication with the computing device and/or controller. The other information may be directly inputted into the system 10 by the user 12 via user interface 26, and/or information indicating the user's mood/emotion in relation to the system 10 or the general feeling of the person. The other information may be used by the computing device 30 to adjust the cyber manufacturing system operational mode. This other information can include, but is not limited to, operational information received from one or more cyber manufacturing facilities.

The demographic information may include, for example, information indicating different levels of anxiety, distrust and/or stress relating to remote robotic devices 20 and/or certain events by people having particular characteristics (e.g., age, race, nationality, etc.). For example, the demographic information may include information indicating a first level of distrust of remote robotic devices and machinery by young people (e.g., people with ages less than 35), information indicating a second level of distrust of remote robotic devices and machinery by middle aged people (e.g., people with ages between 35 and 65), and information indicating a third level of distrust of remote robotic devices and machinery by older people (e.g., people with ages greater than 65). The first, second and third levels of distrust are different from each other. The examples not limited to the particulars of this specific example. An illustrative architecture for the computing device 30 will be discussed below in relation to FIG. 4.

During operation, the user 12 initially may have the option to activate a user mood predictor mode of the computing device 30. In response to a user software interaction selecting the user mood predictor mode, the computing device 30 transitions from an inactive-user mood predicter-mode to an active-user mood predicter-mode in which the ACM software module 36 is enabled. The AMC software module 36 provides two learning options: a supervised machine learning option and an unsupervised machine learning option.

In the supervised machine learning case, the user's mood is predicted based on user-inputted information in addition to the sensor data, demographic data and/or social media data. The user inputted information can include, but is not limited to, simple expressions (e.g., worried, anxious, frustrated, fine, etc.). Natural language processing technology is used to interpret the user inputs, as well understood by a skilled artisan. In the unsupervised machine learning case, user inputted information is not used to predict the user's mood or emotion.

The person's predicted mood or emotion may then be used by the ACM software module 36 to select a proper mode of operation for the robotic device 20 and adaptive cyber manufacturing facility from a plurality of pre-defined cyber manufacturing system operational modes (e.g., normal operational mode, performance operational mode, cautious operational mode, alert operational mode, and failure mode). Thereafter, the ACM software module 36, robotic device 20 and machinery of the adaptive cyber manufacturing facility collectively enforce rules in accordance with the newly selected cyber manufacturing system operational mode. Information specifying actions taken to enforce the rules is stored in a data storage device of the computing device 30 or controller 32. Accordingly, the adaptive cyber manufacturing system and method dynamically change the behavior of the ACM as well as workload (e.g., limiting or slowing down the task in real-time) while it is being used by humans to be responsive to user 12 performance.

Robotic system 10 is not limited to the architecture shown in FIG. 1, and may include more or fewer components than that shown based on a given application. In this regard, it should be understood that FIG. 1 shows a sample architecture for performing a task remotely on an object 24 at a cyber manufacturing facility 22 via control of the robotic device 20 according to instructions from a user interface 26 based on rules associated with a selected one of a plurality of operational modes in accordance with machine-learned moods and/or conditions of the user. Examples may not need to include the remote control of the robotic device 20, but rather the adaption or modification of the cyber manufacturing facility environment, including objects to be worked on and components associated with the objects in the facility (e.g., production line, machinery).

In examples, user 12 may include a production line worker who views objects 24 on production line 28 and robotic arm 20 using an online video communication platform 14 and controls his/her movements to cause the robotic arm 20 to manipulate objects 24 in a desired manner. In any scenario, if a medically-abnormal and/or life-threatening state is observed by sensing device 16 (e.g., an abnormal heart rate), then this information will be communicated to emergency units (e.g., 911). Accordingly, the adaptive CM system provides a safe, inclusive (age, gender, ability, etc), and scalable CM platform. The adaptive CM system provides job opportunities to people with various levels of training, expertise, and ability, e.g., disabled people, women, seniors, etc. Further, teams of users can work together using this adaptive CM system, for example, a group of users may work with a set of robots at the same time in a form of human-robot teaming, The types of tasks that can be performed by the invention are not particularly limited. Any task in any environment that can be performed by a robotic device under human control can be completed by methods, systems and devices of the invention.

Although FIG. 1 shows the preferred embodiment wherein user 12 controls robotic arm by moving his/her hand 18, it is also within the scope of the invention for the user to control the robotic arm (or other robotic system) through a brain-computer interface or movement of his/her eyes, head, etc. Thus, the invention can be used to enable physically disabled individuals to perform tasks they would not otherwise be capable of performing.

A particularly unique element of the invention is an Adaptive Cyber Manufacturing (ACM) platform, which comprises programming configured to modify the interaction of the system with the user and/or modify the output of the system from the robotic arm based on the status of the user. The status is preferably monitored by the system and is preferably at least one member selected from the group consisting of predicted user performance, actual user performance, user fatigue and user emotions. The adaptive cyber manufacturing may use artificial intelligence and machine learning techniques to be responsive to human emotions or human states of mind, such as trust or fatigue, and it will customize the targeted task, e.g., slow down or limit the task while considering the duration, accuracy and speed of the task, to accommodate any workers with any ability and demographic background.

Figure 2:
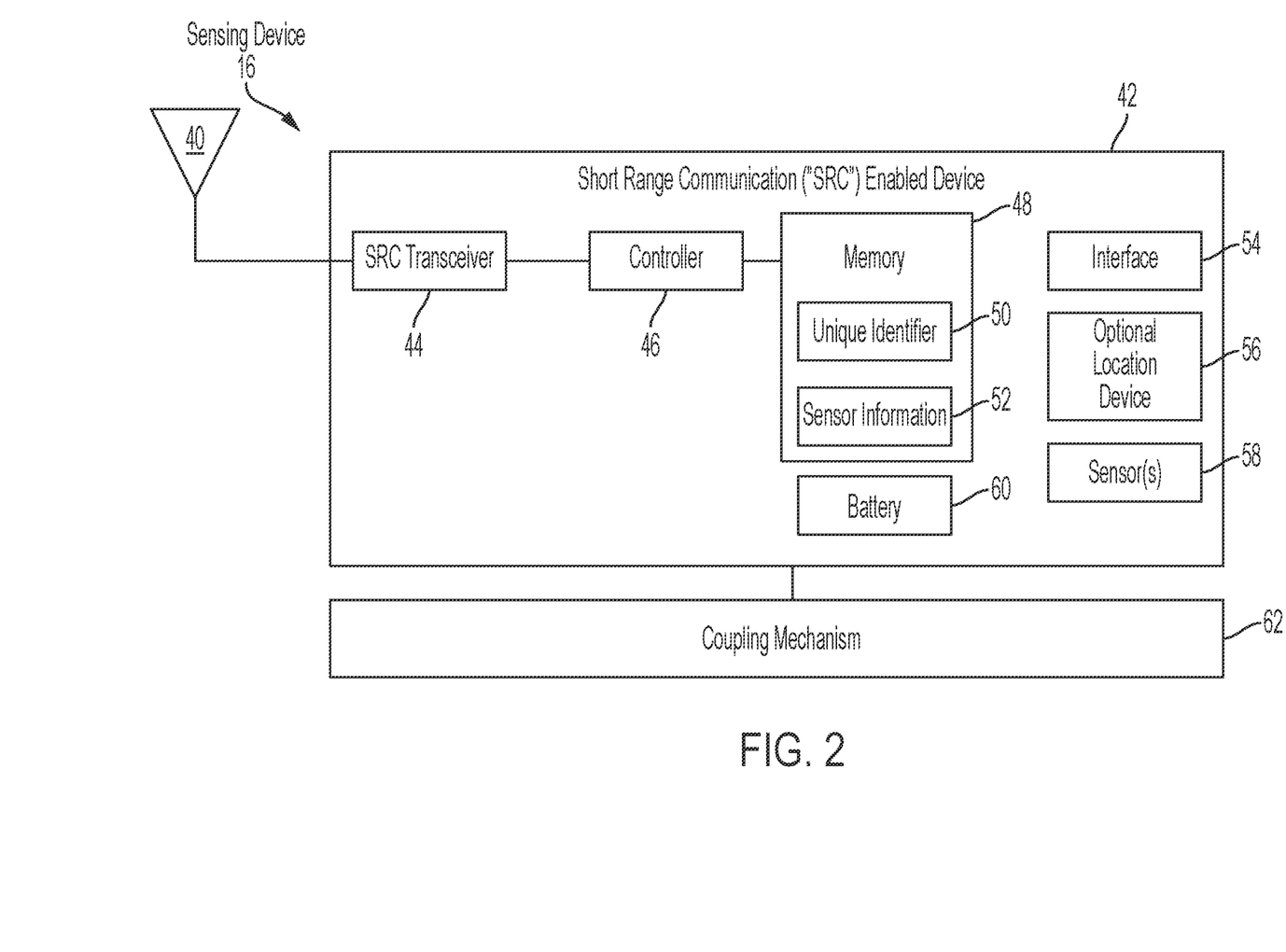
FIG. 2 is a schematic illustration of an exemplary architecture for a sensing device.

FIG. 2 depicts a schematic illustration of an exemplary architecture for a sensing device 16. Sensing device 16 may include more or fewer components than that shown in FIG. 2. However, the components shown are sufficient to disclose an illustrative example. Some or all of the components of the sensing device 16 may be implemented in hardware, software and/or a combination of hardware and software. The hardware includes, but is not limited to, one or more electronic circuits.

The hardware architecture of FIG. 2 represents an illustration of an exemplary sensing device 16 configured to facilitate operational control of remote robotic devices 20 to perform task (e.g., on object 24 including any structural component to which work may be performed) at an adaptive cyber manufacturing facility based on operating instructions from a user 12 according to rules associated with a cyber manufacturing system operational mode selected in view of user condition data, which may include machine-learned human mood(s). In this regard, the sensing device 16 may include an antenna 40 and a Short Range Communication ("SRC") enabled device 42 for allowing data to be exchanged with the external device via SRC technology as well understood by a skilled artisan. Components 44-58 and battery 60 may be collectively referred to herein as the SRC enabled device 42. The SRC enabled device 3542 is coupled to the antenna 40. The antenna 40 is configured to receive SRC signals from the external device and transmit SRC signals generated by the SRC enabled device 42. The SRC enabled device 42 includes an SRC transceiver 44. SRC transceivers are well known in the art, and therefore will not be described herein. However, it should be understood that the SRC transceiver 44 processes received SRC signals to extract information therein. This information may include, but is not limited to, a request for certain information (e.g., a unique identifier 50 and/or sensor information 52). The SRC transceiver 44 may pass the extracted information to the controller 46, which may be the same or similar to controller 32.

If the extracted information includes a request for certain information, then the controller 46 may perform operations to retrieve user condition data (e.g., a unique identifier 50 and/or sensor information 52) from memory 48 (e.g., data storage device). The sensor information 52 may include user condition data indicating a detected skin perspiration, facial temperature, gesture, blinking rate, appearance, and/or sound (e.g., capture speech). The retrieved information is then sent from the sensing device 16 to a requesting external device (e.g., computing device 16 of FIG. 1) via an SRC communication.

The SRC enabled device 42 may also include an interface 54, an optional location device 56, and sensor(s) 58. The interface 54 may include input devices and output devices, which facilitate user-software interactions for controlling operations of the sensing device 16. The input devices include, but are not limited to, a physical and/or touch keyboard. The input devices can be connected to the sensing device 16 via a wired or wireless connection (e.g., a Bluetooth® connection). The output devices may include, but are not limited to, a speaker, a display, and/or light emitting diodes. Interface 54 is also configured to facilitate wired or wireless communications to and from external devices.

Still referring to FIG. 2, the sensing device 16 may also include one or more sensors 58. The sensors 58 can facilitate the determination of a predicted mood for a user 12. In this regard, the sensors may include a heart rate sensor, a skin perspiration sensor, a facial temperature sensor, a gesture detection sensor, a blinking rate detection sensor, a camera, a brain-computer interface, and/or a microphone (e.g., to capture speech).

In examples, the connections between the SRC transceiver 44, controller 46, memory 48, interface 54, optional location device 56 and sensor(s) 58 are unsecure connections or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

The memory 48 may include a volatile memory and/or a non-volatile memory. For example, the memory 48 may include a Random Access Memory ("RAM"), a Dynamic Random Access Memory ("DRAM"), a Static Random Access Memory ("SRAM"), a Read-Only Memory ("ROM"), a flash memory and/or a solid-state drive. The memory 48 may also include unsecure memory and/or secure memory. The phrase "unsecure memory" refers to memory configured to store data in a plain text form. The phrase "secure memory" refers to memory configured to store data in an encrypted form and/or memory having or being disposed in a secure or tamper-proof enclosure.

The sensing device 16 may also include or communicate with a coupling mechanism 62, which is configured to couple the sensing device 16 to an object or user 12. In this regard, the coupling mechanism 16 may include a screw, a bolt, an adhesive, a lock, a latch, a weld, a chemical bond, and/or any other coupling approaches as well understood by a skilled artisan.

Figure 3:
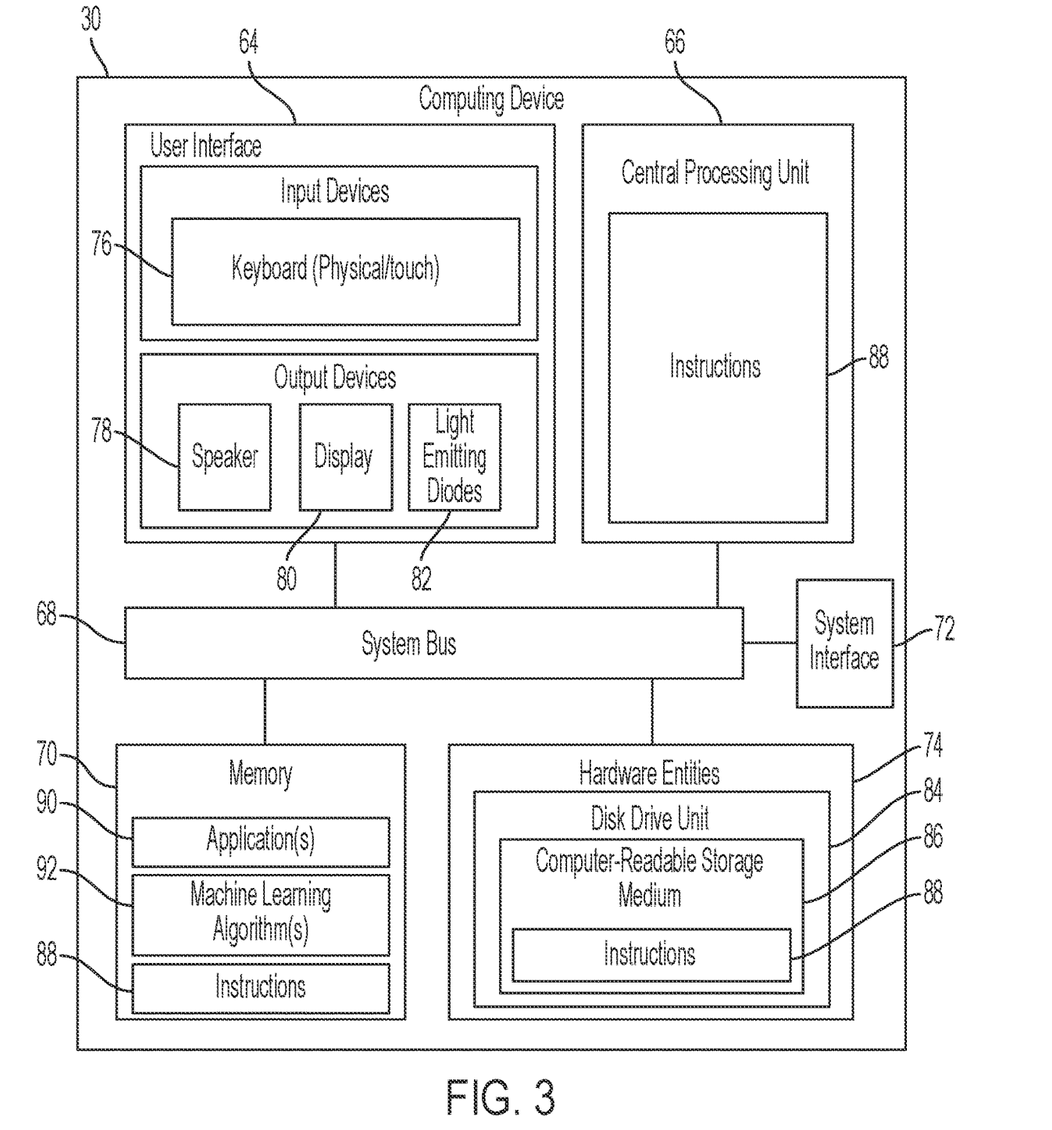
FIG. 3 is block diagram of an exemplary architecture for a computing device for executing instructions to automatically control a robotic device, adaptive cyber manufacturing facility and components thereof.

FIG. 3 illustrates a block diagram of an exemplary architecture for a computing device 30 for executing instructions to automatically control the robotic device 20, adaptive cyber manufacturing facility and components thereof. The exemplary controller 32 may provide input to or be a component of the computing device 30. It is understood that the controller 32 and controller 46 are the same as or similar to computing device 30 and may share components with the computing device, yet may be shown at different locations to help clarify that the controllers may be located at the first location 11, the second location 22 or some other location in communication with components and devices at both locations, as is readily understood by a skilled artisan. As such, the discussion of computing device 30 is sufficient for understanding these components of the adaptive cyber manufacturing system user interface 26, robotic device 20, and/or adaptive cyber manufacturing facility. In some examples, the adaptive cyber manufacturing system is used in a client-server architecture. Accordingly, the computing device architecture shown in FIG. 3 is sufficient for understanding the particulars of client computing devices and servers.

The computing device 30 may include more or fewer components than those shown in FIG. 3. However, the components shown are sufficient to disclose an illustrative example. The hardware architecture of FIG. 3 represents one implementation of a representative computing device configured to provide an improved task execution process, as described herein. As such, the computing device 30 implements at least a portion of the method(s) described herein.

Some or all components of the computing device 30 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 30 includes user interface 64, Central Processing Unit ("CPU") 66, system bus 68, a memory 70 (e.g., data storage device) connected to and accessible by other portions of computing device 30 through the system bus, system interface 72, and hardware entities 74 connected to the system bus. The user interface 64 may include input devices and output devices, which facilitate user-software interactions for controlling operations of the computing device 30. The input devices may include, but are not limited to, physical and/or touch keyboard 76. The input devices can be connected to the computing device 30 via a wired or wireless connection (e.g., a Bluetooth® connection). In other words, the user interface 64 may be configured as one or more conventional mechanism common to controllers and/or computing devices that may permit a user 12 to input information to the exemplary computing device 30. The user interface 64 may further include, for example, a touchscreen with "soft" buttons or with various components for use with a compatible stylus, a microphone by which a user may provide oral commands to the exemplary computing device 30 to be "translated" by a voice recognition program, or other like device by which a user may communicate specific operating instructions to the exemplary computing device. The user interface 64 may be a part or a function of a graphical user interface (GUI) mounted on, integral to, or associated with, the computing device 30 and adaptive cyber manufacturing system 10 with which the computing device is associated.

The output devices may be configured as one or more conventional mechanisms that output information to a user, including, but not limited to, a display screen on a GUI of the user interface 26, computing device 30, and/or associated image forming devices with which the exemplary adaptive cyber manufacturing system 10 may be associated (e.g., speaker 78, display 80, and/or light emitting diodes 82). The output devices may be used to indicate to user 12 a status of the cyber manufacturing facility with which the exemplary computing device 30 may be associated including an operation of robotic devices 20 and controlled components at one or more of a plurality of cyber manufacturing facilities associated with the adaptive cyber manufacturing system 10.

The CPU 66 may include one or more local processors for individually operating the computing device 30 and for carrying into effect control and operating functions for performing a task remotely on an object at an adaptive cyber manufacturing facility having a robotic device, including receiving, via a computing device, cyber manufacturing system data including information regarding operation of a cyber manufacturing system, regarding operation of the robotic device at the cyber manufacturing facility, and regarding the object on which the task is to be performed by the robotic device; reporting the cyber manufacturing system data to a remote user of the robotic device via a user interface; acquiring user condition data regarding a condition of the user; acquiring instructions from the user interface for remotely operating the robotic device to perform the task; selecting, by the computing device a cyber manufacturing system operational mode from a plurality of pre-defined cyber manufacturing system operational modes based on the user condition data; and causing, via the computing device, control of the robotic device to perform the task on the object according to the instructions from the user interface based on rules associated with the selected cyber manufacturing system operational mode. CPU 66 may include at least one conventional processor or microprocessor that interprets and executes instructions 420 to direct specific functioning of the computing device 30, and control of the robotic device 20.

The system interface 72 is configured to facilitate wired or wireless communications to and from external devices (e.g., network nodes such as access points, etc.). The exemplary system interface 72 may thus include one or more separate external communication interfaces by which the exemplary computing device 30 may communicate with components that may be external to the exemplary computing device including additional robotic devices 20 and cyber manufacturing facilities. At least one of the external communication interfaces may be configured as an input port to support connecting an external CAD/CAM device storing modeling information for execution of the control functions in external robotic devices and additional cyber manufacturing facility operations. Any suitable data connection to provide wired or wireless communication between the computing device 30 and external and/or associated components is contemplated to be encompassed by the depicted system interface 72.

At least some of the hardware entities 74 perform actions involving access to and use of memory 70, which may be a RAM, a solid-state or disk driver and/or a Compact Disc Read Only Memory ("CD-ROM"). In other words, memory 70 may include a RANI or another type of dynamic storage device that is capable of storing updatable database information, and for separately storing instructions for execution of robotic device 20 operations by, for example, CPU 66. Memory 70 may also include ROM, which may include a conventional ROM device or another type of static storage device that stores static information and instructions for processor(s) 74. Further, the data storage device(s) 76 may be integral to the exemplary CPU 66, or may be provided external to, and in wired or wireless communication with, the computing device 30, including as cloud-based data storage components.

Hardware entities 74 may include a disk drive unit 84 having a computer-readable storage medium 86 on which is stored one or more sets of instructions 88 (e.g., software code) configured to implement one or more of the methodologies, procedures, or functions described herein. The instructions 88 can also reside, completely or at least partially, within the memory 70 and/or within the CPU 66 during execution thereof by the computing device 30. The memory 70 and the CPU 66 may also include machine-readable media. The term "machine-readable media" refers to a single medium or multiple media (e.g., a centralized or distributed database, and/or associated caches and servers) that store the one or more sets of instructions 88. Machine-readable media may also refers to any medium capable of storing, encoding or carrying a set of instructions 88 for execution by the computing device 30 and that cause the computing device 30 to perform any one or more of the methodologies of the present disclosure. The term "machine-readable storage medium" or "machine-readable media" shall accordingly be taken to include, but not be limited to, solid-state memories, and optical and magnetic media.

Computing device 30 implements machine learning technology. In this regard, computing device 30 runs one or more software applications 90 for facilitating the purchase of articles based on machine-learned information thereabout. The software applications 90 may use machine learning algorithms 92 to learn characteristics of users associated with the user interface 26, robotic device 20 cyber manufacturing facility and adaptive cyber manufacturing system. This learned information may be used for various purposes as described herein. For example, an image of a user operating the robotic device 20 via user interface 26 may be captured and processed to extract features of the person. The extracted features may be compared to learned features of a person associated with anxiety, distrust, frustration, fatigue, and/or stress. The learned features may be obtained using historical sensor data of other people and/or the same person who had the same and/or different experience during a previous operation of the robotic device 20 via user interface 26.

All of the various components of the exemplary computing device 30, as depicted in FIG. 3, may be connected internally by one or more data/control busses of the system bus 68, and externally to the user interface 26, robotic device 20, adaptive cyber manufacturing facility and/or components thereof, by one or more data/control busses of the system interface 72. These data/control busses may provide wired or wireless communication between the various components of the computing device 30, user interface 26, robotic device 20, adaptive cyber manufacturing facility, and any associated robotic device and adaptive cyber manufacturing facility, whether all of those components are housed integrally in, or are otherwise external and connected to adaptive cyber manufacturing system 10 with which the computing device 30 may be associated.

It should be appreciated that, although depicted in FIG. 3 as an integral unit, the various disclosed elements of the exemplary computing device 30 may be arranged in any combination of sub-systems as individual components or combinations of components, integral to a single unit, or external to, and in wired or wireless communication with the single unit of the exemplary computing device. In other words, no specific configuration as an integral unit or as a support unit is to be implied by the depiction in FIG. 3. Further, although depicted as individual units for ease of understanding of the details provided in this disclosure regarding the computing device 30, it should be understood that the described functions of any of the individually-depicted components, and particularly each of the depicted control devices, may be undertaken, for example, by one or more processors connected to, and in communication with, one or more memory devices 70.

Figure 4:
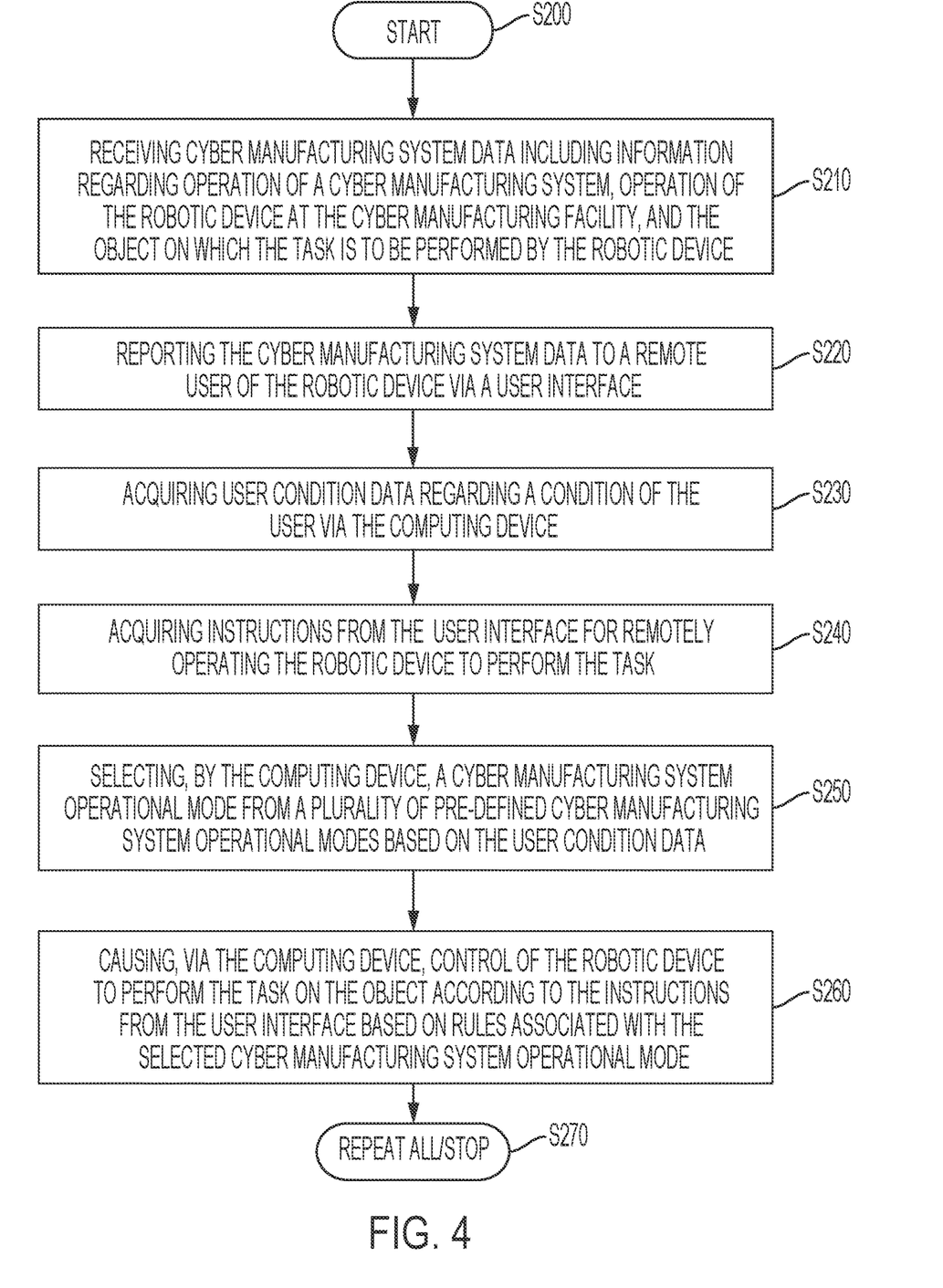
FIG. 4 is a flowchart depicting a method for performing a task remotely on an object at an adaptive cyber manufacturing facility having a robotic device.

The disclosed embodiments may include an exemplary method for performing a task remotely on an object at an adaptive cyber manufacturing facility having a robotic device. FIG. 4 illustrates a flowchart of such an exemplary method. As shown in FIG. 4, operation of the method commences at Step S200 and proceeds to Step S210.

At Step S210, a computing device receives cyber manufacturing system data including information regarding operation of a cyber manufacturing system, regarding operation of the robotic device at the cyber manufacturing facility, and regarding the object on which the task is to be performed by the robotic device. Operation proceeds to Step S220, where a user interface reports the cyber manufacturing system data to a remote user of the robotic device. Operation of Steps S210 and S220 may coincide with or precede Step S230, where the computing device acquires user condition data regarding a condition of the user. Operation of Step S230 may coincide with or precede Step S240, where the computing device acquires instructions from the user via the user interface for remotely operating the robotic device to perform the task.

Operation of the method may proceed to Step S250, where the computing device automatically selects a cyber manufacturing system operational mode from a plurality of pre-defined cyber manufacturing system operational modes based on the user condition data. In examples the cyber manufacturing system operational mode may include: a normal mode when the user condition data indicates that the user does not currently have anxiety, distrust, frustration, fatigue, or stress based on the cyber manufacturing system; a performance mode when the user condition data indicates that the user is operating at a superior performance level higher than a predetermined threshold level, and workload is increased from the normal mode; a cautious mode when the user condition data indicates that the user currently has anxiety, distrust, frustration, fatigue, or stress based on the cyber manufacturing system, the cautious mode having a decreased workload from the normal mode; an alert mode when the user condition data indicates that the person has a disability or limitation due to health or age, the alert mode having a decreased workload from the normal mode; and a failure mode when the user condition data indicates a detection of unusual cyber manufacturing system activities based on any one of the user condition data, an operational failure of the cyber manufacturing system, malware and a cyber-attack. Steps S230 and S250 may be continuously or periodically executed as the computing system is configured to shift the selected cyber manufacturing system operational mode to another mode upon updated user condition data acquired in Step S230. Trust, distrust, satisfaction, frustration, anxiety and fatigue can be measured as human factors. With the human factors measurable in real time, the computing system can shift the selected cyber manufacturing system operational mode during tasks/work operations to another mode upon updated user condition data.

Operation of the method proceeds to Step S260, where the computing device causes control of the robotic device to perform the task on the object according to the instructions from the user interface based on rules associated with the selected cyber manufacturing system operational mode. Operation may cease at Step S270, or may continue by repeating back to at least Steps S210, S230, or S240 to continue performing a task remotely on an object at an adaptive cyber manufacturing facility having a robotic device.

The exemplary depicted sequence of executable method steps represents one example of a corresponding sequence of acts for implementing the functions described in the steps. The exemplary depicted steps may be executed in any reasonable order to carry into effect the objectives of the disclosed examples. No particular order to the disclosed steps of the method is necessarily implied by the depiction in FIG. 4, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of robotic devices and systems common to cyber manufacturing facilities and platforms in many different configurations. For example, the user condition data of a specific user may be stored as a part of that user's personal profile, which may be transferable to other adaptive cyber manufacturing facilities and systems, as well understood by a skilled artisan. It should be understood that these are non-limiting examples of the variations that may be undertaken according to the disclosed schemes. In other words, no particular limiting configuration is to be implied from the above description and the accompanying drawings.

While the invention has been described in detail and with reference to specific examples thereof, it will be apparent to one skilled in the art that various changes and modifications can be made therein without departing from the spirit and scope thereof.

What is claimed is:

1. A method for performing a task remotely on an object at an adaptive cyber manufacturing facility having a robotic device, said method comprising:
 a) receiving, via a computing device, cyber manufacturing system data including information regarding operation of a cyber manufacturing system, regarding operation of the robotic device at the cyber manufacturing facility, and regarding the object on which the task is to be performed by the robotic device;
 b) reporting the cyber manufacturing system data to a remote user of the robotic device via a user interface;
 c) acquiring user condition data regarding the user via the computing device, wherein the user condition data is used to determine any of a plurality of conditions of the user;
 d) acquiring instructions from the user interface for remotely operating the robotic device to perform the task;
 e) selecting, by the computing device, a cyber manufacturing system operational mode from a plurality of pre-defined cyber manufacturing system operational modes based on the determined any of the plurality of conditions of the user, wherein each of the plurality of pre-defined cyber manufacturing system operational modes has one or more pre-defined rules for controlling operations of the cyber manufacturing system, and wherein at least one of the one or more pre-defined rules for each of the plurality of pre-defined cyber manufacturing system operational modes comprises a workload pace for the pre-defined cyber manufacturing system operational mode; and
 f) causing, via the computing device, control of the robotic device to perform the task on the object according to the instructions from the user interface based on the one or more pre-defined rules associated with the selected cyber manufacturing system operational mode.

2. The method of claim 1, wherein information regarding the object on which the task is to be performed includes information of the cyber manufacturing facility associated with the object.

3. The method of claim 1, wherein the user condition data is received by the computing device from one or more sensing devices, the user condition data including one or more of the user's performance status, the user's emotion and physiological status, the user's emotion and physiological response to the cyber manufacturing system, and a detection of unusual cyber manufacturing system activity, the cyber manufacturing system including the user interface, the robotic device, the cyber manufacturing facility and the computing device.

4. The method of claim 3, wherein the user's performance status correlates to user emotion and physiological status including one of user trust level in the cyber manufacturing system, user satisfaction level with the cyber manufacturing system, user fatigue level, user emotional state, user physical disability, user physiological status, and user expertise according to the user's performance ability.

5. The method of claim 3, wherein the plurality of pre-defined cyber manufacturing system operational modes include:
a normal mode when the user condition data indicates that the user does not currently have anxiety, distrust, frustration, fatigue, or stress based on the cyber manufacturing system;
a performance mode when the user condition data indicates that the user is operating at a superior performance level higher than a predetermined threshold level, and wherein at least one of the one or more pre-defined rules for the performance mode is that the workload pace is increased from that of the normal mode;
a cautious mode when the user condition data indicates that the user currently has anxiety, distrust, frustration, fatigue, or stress based on the cyber manufacturing system, wherein the one or more pre-defined rules for the cautious mode are designed to rebuild the user's trust and/or deal with the user's fears or anxieties in relation to the cyber manufacturing system, wherein the one or more rules for the cautions mode are that (1) the workload pace is to remain below a given threshold value, (2) the workload pace decreases upon a failed task attempt, (3) the workload pace increases upon a pre-determined number of consecutive successful task attempts, (4) the workload pace decreases if a task takes longer than a threshold time, and/or (5) the workload pace increases if successful performance of the consecutive tasks takes less time than a threshold time, and the selected cyber manufacturing system operational mode is configured to automatically shift from the cautious mode to the normal mode upon an updated user condition data indicating that the user no longer has anxiety, distrust, frustration, fatigue, or stress based on the cyber manufacturing system;
an alert mode when the user condition data indicates that the person has a disability or limitation due to health or age, wherein at least one of the one or more pre-defined rules for the alert mode is that the workload pace of the alert mode is decreased from that of the normal mode; and
a failure mode when the user condition data indicates a detection of unusual cyber manufacturing system activities based on any one of the user condition data, an operational failure of the cyber manufacturing system, malware and a cyber-attack.

6. The method of claim 3, wherein cyber manufacturing system includes an emergency-awareness feature that reports at least one of the user's medically-abnormal states or life-threatening states to emergency units.

7. The method of claim 3, wherein the one or more sensing devices include a heart rate sensor, a skin perspiration sensor, a temperature sensor, a gesture detection sensor, a blinking rate detection sensor, a camera, a brain-computer interface and a microphone.

8. The method of claim 1, wherein at least one of the one or more pre-defined rules for each of the plurality of pre-defined cyber manufacturing system operational modes comprises control modifications for the robot and the cyber manufacturing facility for each of the plurality of pre-defined cyber manufacturing system operational modes.

9. The method of claim 1, wherein the user interface includes a brain-computer interface that detects brain activity of the user and associates the brain activity with the instructions from the user interface for remotely operating the robotic device to perform the task.

10. The method of claim 1, wherein the user interface includes a camera that monitors user motion including eye movement, face gesture, and hand movement of the user and associates the user motion with the instructions from the user interface for remotely operating the robotic device to perform the task.

11. The method of claim 1, wherein the cyber manufacturing system operational mode is automatically selected based on machine-learned patterns associated with the user condition data and operation of the cyber manufacturing system.

12. The method of claim 1, wherein the cyber manufacturing system operational mode is automatically selected based on natural language processing technology to interpret at least one of recorded human speech and simple expression inputs.

13. The method of claim 1, further comprising communicating the user condition data and the selected cyber manufacturing system operational mode with a second cyber manufacturing system for achieving objectives of an Adaptive Cyber Manufacturing system and objectives of customized cyber manufacturing.

14. An adaptive cyber manufacturing system, comprising:
a robotic device at a cyber manufacturing facility;
a non-transitory storage medium;
a user interface remote from the robotic device; and
a processor configured to access the non-transitory storage medium and execute computer-executable instructions stored in non-transitory storage medium to cause the system to:
acquire cyber manufacturing system data including information regarding operation of the robotic device and regarding an object on which a task is to be performed by the robotic device at the cyber manufacturing facility;
report the cyber manufacturing system data to a remote user of the robotic system via the user interface;
acquire user condition data regarding the user, wherein the user condition data is used to determine any of a plurality of conditions of the user;
acquire instructions from the user interface for remotely operating the robotic device to perform the task;
select a cyber manufacturing system operational mode from a plurality of pre-defined cyber manufacturing system operational modes based on the determined any of the plurality of conditions of the user, wherein each of the plurality of pre-defined cyber manufacturing system operational modes has one or more pre-defined rules for controlling operations of the cyber manufacturing system, and wherein at least one of the one or more pre-defined rules for each of the plurality of pre-defined cyber manufacturing system operational modes comprises a workload pace for the pre-defined cyber manufacturing system operational mode; and cause control of the robotic device to perform the task on the object according to the instructions from the user interface based on the one or more pre-defined rules associated with the selected cyber manufacturing system operational mode.

15. The system of claim 14, further comprising one or more sensing devices in communication with the user interface, wherein the user condition data is acquired by the system from the one or more sensing devices, the user condition data including one or more of the user's performance status, the user's emotion and physiological status, the user's emotion and physiological response to the cyber manufacturing system, and a detection of unusual cyber manufacturing system activity, the cyber manufacturing system including the user interface, the robotic device, the cyber manufacturing facility and the computing device.

16. The system of claim 15, wherein at least one of the one or more pre-defined rules for each of the plurality of pre-defined cyber manufacturing system operational modes comprises control modifications for the robot and the cyber manufacturing facility for each of the plurality of pre-defined cyber manufacturing system operational modes, and the user's performance status correlates to user emotion and physiological status including one of user trust level in the cyber manufacturing system, user satisfaction level with the cyber manufacturing system, user fatigue level, user emotional state, user physical disability, user physiological status, and user expertise according to the user's performance ability.

17. The system of claim 15, wherein the plurality of pre-defined cyber manufacturing system operational modes include:

a normal mode when the user condition data indicates that the user does not currently have anxiety, distrust, frustration, fatigue, or stress based on the cyber manufacturing system;

a performance mode when the user condition data indicates that the user is operating at a superior performance level higher than a predetermined threshold level, and wherein at least one of the one or more pre-defined rules for the performance mode is that the workload pace is increased from that of the normal mode;

a cautious mode when the user condition data indicates that the user currently has anxiety, distrust, frustration, fatigue, or stress based on the cyber manufacturing system, wherein the one or more pre-defined rules for the cautious mode are designed to rebuild the user's trust and/or deal with the user's fears or anxieties in relation to the cyber manufacturing system, wherein the one or more rules for the cautions mode are that (1) the workload pace is to remain below a given threshold value, (2) the workload pace decreases upon a failed task attempt, (3) the workload pace increases upon a pre-determined number of consecutive successful task attempts, (4) the workload pace decreases if a task takes longer than a threshold time, and/or (5) the workload pace increases if successful performance of the consecutive tasks takes less time than a threshold time, and the selected cyber manufacturing system operational mode is configured to automatically shift from the cautious mode to the normal mode upon an updated user condition data indicating that the user no longer has anxiety, distrust, frustration, fatigue, or stress based on the cyber manufacturing system;

an alert mode when the user condition data indicates that the person has a disability or limitation due to health or age, wherein at least one of the one or more pre-defined rules for the alert mode is that the workload pace of the alert mode is decreased from that of the normal mode; and a failure mode when the user condition data indicates a detection of unusual cyber manufacturing system activities based on any one of the user condition data, an operational failure of the cyber manufacturing system, malware and a cyber-attack.

18. The system of claim 15, wherein the one or more sensing devices include a heart rate sensor, a skin perspiration sensor, a facial temperature sensor, a gesture detection sensor, a blinking rate detection sensor, a camera, a brain-computer interface and a microphone.

19. The system of claim 14, wherein the user interface includes a brain-computer interface sensor that detects brain activity of the user and associates the brain activity with the instructions from the user interface for remotely operating the robotic device to perform the task.

20. The system of claim 14, wherein the user interface includes a camera that monitors user motion including eye movement, face gesture, and hand movement of the user and associates the user motion with the instructions from the user interface for remotely operating the robotic device to perform the task.

* * * * *